(No Model.)
A. B. WOODARD.
VEHICLE WHEEL.
No. 291,457. Patented Jan. 1, 1884.
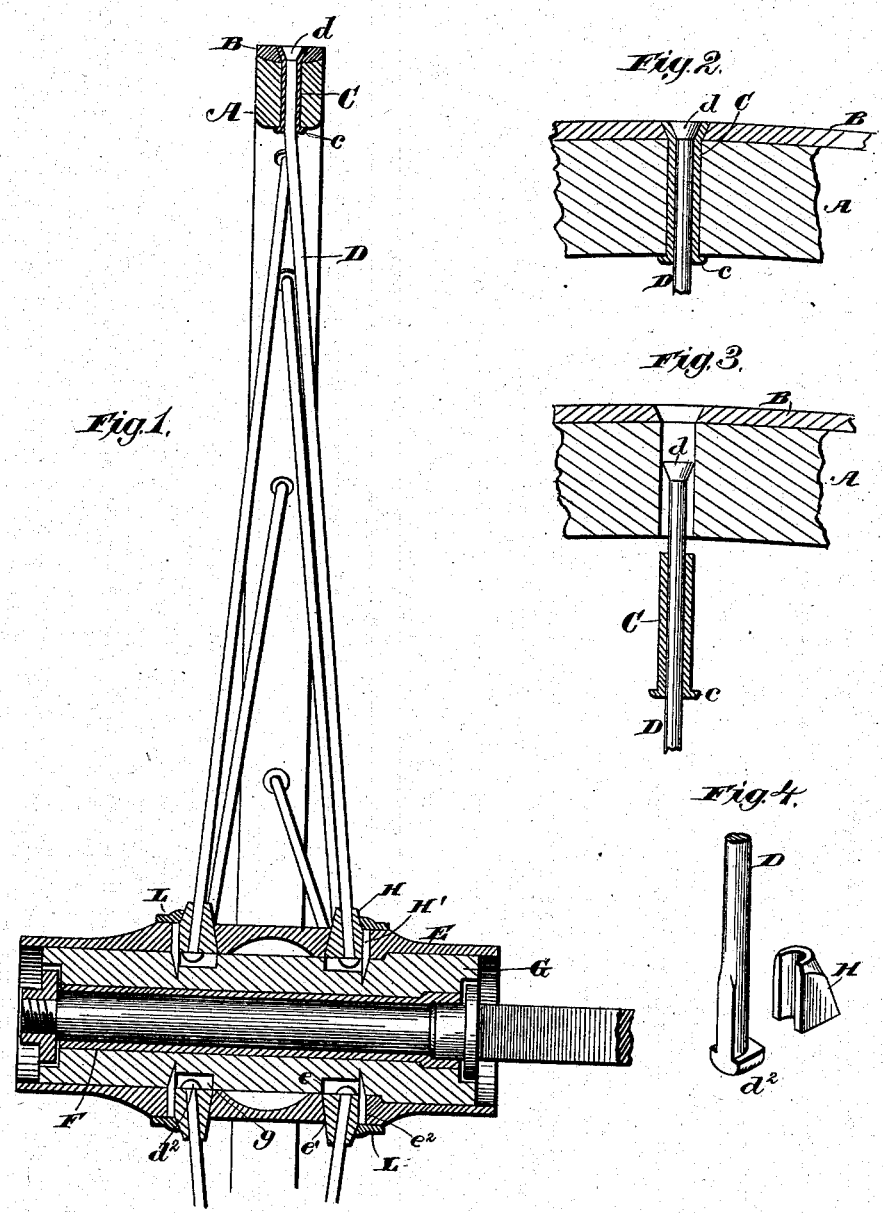
Witnesses
Robert Everett
J. A. Rutherford
Inventor
Alonzo B. Woodard
By James L. Norris.
Atty

UNITED STATES PATENT OFFICE.

ALONZO B. WOODARD, OF HORNELLSVILLE, NEW YORK.

VEHICLE-WHEEL.

SPECIFICATION forming part of Letters Patent No. 291,457, dated January 1, 1884.

Application filed May 1, 1883. (No model.)

*To all whom it may concern:*

Be it known that I, ALONZO B. WOODARD, a citizen of the United States, residing at Hornellsville, in the county of Steuben and State of New York, have invented new and useful Improvements in Vehicle-Wheels, of which the following is a specification.

The present invention relates to that class of carriage-wheels in which the hub and rim are connected by metallic spokes having means for tightening the same in the hub and rim.

The invention consists in fitting a series of spoke thimbles or sleeves in the rim and tire of the wheel, said thimbles being retained by means of flanges on their inner ends, which bear against the inner surface of the rim, and by swaging or expanding the outer ends of said thimbles by conical enlargements or heads on the outer ends of the spokes. In this manner the thimbles and spokes are securely fastened in the rim of the wheel and the tire and rim firmly bound together, the vibration or play of the spokes in the tire and rim being also effectually prevented, so as to guard against the wear of the rim as in carriage-wheels of the ordinary construction.

The invention also consists in securing the inner ends of the spokes to the hub or nave by means of wedge-shaped locking-blocks, which have an aperture or groove for the reception of the spoke, and are seated in grooves or mortises made in the hub, being secured therein by wedges or keys. The locking-blocks encircle or fit around the spokes, and are held thereon by heads formed on said spokes after the blocks have been slipped thereon, or when grooved blocks are employed the same are slipped onto spokes which have a flat side, constituting part of the surface against which the fastening-wedge lies.

In the drawings, Figure 1 is a vertical longitudinal section of a carriage-wheel constructed according to my invention. Fig. 2 is a section of a portion of the rim, showing one of the spokes in position. Fig. 3 is a detail view of a portion of the rim and tire, showing the manner of passing the spokes and their thimbles through the same before they are secured; and Fig. 4 is a detail view of a grooved locking-block and flat-faced spoke.

The letter A indicates the rim or felly of the wheel, which may be constructed of metal, wood, or other appropriate material, and B is the metallic tire secured to said rim by the same fastening device which holds the spokes in position. A series of countersunk holes are made in the tire, and in line therewith are arranged apertures, which extend entirely through the rim. These holes in the tire and rim are made sufficiently large to receive metallic sleeves or thimbles C, which serve as a bushing or lining for said holes and as spoke-sockets, as is clearly indicated in Fig. 1. The spokes D are made of metallic rods, and have enlargements or cone-shaped heads $d$, formed on their outer ends, which are made of such size that they can be slipped through the holes in the rim and tire from the inner side of said rim. The sleeves or thimbles C are constructed with inner horizontal flanges, $c$, which rest or bear against the inner surface of the rim of the wheel when the thimbles are fastened in the rim and tire.

In Fig. 3 is indicated the manner of introducing the spokes and their encircling-thimbles into the rim and felly, it being observed that the enlarged head of each spoke is first passed through the apertured rim and felly, and then the thimble is driven into position until its outer end comes flush with the tread-surface of the tire and the flanges rest against the inner surface of the rim. A suitable device or stop is then placed against the inner or flanged end of the thimble, and the headed end of the spoke driven back into the thimble, which will cause the end of the latter to be swaged or spread in the countersunk hole in the tire, as is clearly shown in Fig. 1. In this manner the thimbles and spokes are firmly secured to the rim and tire, and all these parts are intimately connected with each other, so as to render impossible any play or independent movement of the spokes in their sockets or of the tire upon the spokes or rim.

The hub shown in the present instance is composed of two concentric shells, E F, and an intermediate filling, G, of wood, which parts are held together in any approved manner. The outer shell, E, has a number of circumferential mortises or openings, $e$, having each an inclined face, $e'$, and a straight face, $e^2$. The wood lining opposite these openings $e$ is also provided with grooves or cavities $g$, s shown in Fig. 1. The inner ends of the spokes are secured in the mortised hub by means of wedge-shaped locking-blocks H, which may have apertures extending through the center thereof from top to bottom, as is shown in Fig. 1, or the blocks may have a groove, as is shown in Fig. 3. The blocks are fitted on the spokes so as to surround the same, and a head, $d^2$, is formed on the inner end of each spoke for preventing the block from sliding off therefrom. The spokes with the locking-blocks fitted thereon are inserted into the mortises in the hubs, so as to bring the oblique face of each block opposite the inclined face of the mortise in the hub, whereupon a key, H', is driven into the wood filling G, the wedge being inserted between the straight faces of the block and the mortise. When a wooden filling is used, it may suffice to secure the various wedges which hold the spoke-locking blocks by driving them sufficiently far into the wood; but it is also proposed to employ outer encircling-bands, K, which fit over the wedges and hold them in place, as is shown in Fig. 1. Such bands are indispensable when the hub is made entirely of metal.

In the construction of locking-block shown in Fig. 1 the head on the inner end of the spoke is formed after the block has been slipped on a spoke, which may be a simple round metallic rod.

Fig. 4 illustrates a modified form of block in which a vertical groove is formed in the straight side of the block, or the side thereof in contact with the retaining-key. This groove is U-shaped in cross-section, and the spoke is correspondingly shaped, so as to exactly fit into said groove and cause the straight face of the spoke to form part of the surface against which the retaining-key bears.

When a grooved block is used, it is evident that the heads on the inner ends of the spokes can be formed before the locking-blocks are applied thereto.

The lining or bushing C, instead of being made in one piece, as shown in the drawings, may be constructed of two longitudinally-divided shells or sections.

Having thus described my invention, what I claim is—

1. In combination with a rim having apertures, and bushings for said apertures having flanges and flaring outer ends, as shown, a series of metal spokes having enlarged ends, the outer ends being received in the bushings, and the inner ends held to the hub by movable locking-bearings, substantially as described.

2. The combination, in a vehicle-wheel, of the spokes passing through the rim, the wedge-blocks secured to said spokes, the hub mortised for the reception of the wedge-blocks, and the keys for securing the wedge-blocks in position, substantially as described.

3. The combination of a spoke-locking block having a spoke-receiving groove with an apertured hub, a spoke having a straight face at its inner end, and a fastening-key, substantially as described.

4. The combination of a metallic hub having a wood filling and radial mortises with spokes having wedge-shaped locking-blocks, and keys driven into the wood filling, substantially as described.

5. The combination, with the spokes, the hub having recesses, and the wedge-shaped locking-blocks, of the locking-keys and the band L, for locking the entire series of keys in place, substantially as described.

In testimony whereof I have hereunto set my hand in the presence of two subscribing witnesses.

ALONZO B. WOODARD.

Witnesses:
H. C. JILLSON,
S. H. CRANE.